(12) United States Patent  (10) Patent No.: US 9,409,449 B2
Cis et al.  (45) Date of Patent: Aug. 9, 2016

(54) SPINDLE ASSEMBLY FOR A TIRE INFLATION SYSTEM

(71) Applicant: DANA ITALIA S.P.A., Arco (Trento) (IT)

(72) Inventors: Alberto Cis, Ledro (IT); Christian Lorenzini, Rovereto (IT); Michele Sandri, Villa Lagarina (IT); Virginia Badiola Urquiola, Navarra (ES)

(73) Assignee: Dana Italia S.P.A., Arco (Trento) (IT)

( * ) Notice: Subject to any disclaimer, the term of this patent is extended or adjusted under 35 U.S.C. 154(b) by 69 days.

(21) Appl. No.: 13/261,973

(22) PCT Filed: Apr. 15, 2013

(86) PCT No.: PCT/EP2013/057781
§ 371 (c)(1),
(2) Date: Oct. 15, 2014

(87) PCT Pub. No.: WO2013/156430
PCT Pub. Date: Oct. 24, 2013

(65) Prior Publication Data
US 2015/0068653 A1  Mar. 12, 2015

Related U.S. Application Data

(60) Provisional application No. 61/635,339, filed on Apr. 19, 2012.

(30) Foreign Application Priority Data

Apr. 19, 2012  (EP) ..................................... 12164828

(51) Int. Cl.
*B60C 29/04*  (2006.01)
*B60C 23/00*  (2006.01)

(52) U.S. Cl.
CPC .................................. *B60C 23/003* (2013.01)

(58) Field of Classification Search
CPC ...................................................... B60C 23/003
USPC .......................................................... 152/417
See application file for complete search history.

(56) References Cited

U.S. PATENT DOCUMENTS 4,730,656 A * 3/1988 Goodell ................ B60C 23/003
137/224
4,987,937 A  1/1991 Nowicke
(Continued)

FOREIGN PATENT DOCUMENTS

EP  0588595 A1  3/1994

*Primary Examiner* — Jeffrey J Restifo
(74) *Attorney, Agent, or Firm* — Marshall & Melhorn, LLC

(57) ABSTRACT

A spindle assembly for a tire inflation system having a spindle defining an axial direction and a fluid conduit. A rotatable part is rotatably mounted on the spindle and has a fluid passage. The fluid passage is configured to be in fluid communication with a pneumatic tire. A dynamic annular seal chamber is also provided. The annular seal chamber is disposed radially between the spindle and the rotatable part. The fluid conduit and the fluid passage are in fluid communication with each other through the annular seal chamber. The annular seal chamber is disposed axially between a first volume and a second volume. The first volume and the second volume are in fluid communication with each other through at least one fluid channel for leading fluid leaked out of the annular seal chamber and leaked into the first volume and/or into the second volume through the fluid channel.

17 Claims, 11 Drawing Sheets

(56) References Cited

U.S. PATENT DOCUMENTS

| | | | | |
|---|---|---|---|---|
| 5,174,839 A * | | 12/1992 | Schultz | B60C 23/003 152/415 |
| 5,203,391 A * | | 4/1993 | Fox | B60C 23/003 152/415 |
| 5,221,381 A | | 6/1993 | Hurrell, II | |
| 5,236,028 A * | | 8/1993 | Goodell | B60C 23/003 152/417 |
| 5,868,881 A * | | 2/1999 | Bradley | B60C 23/003 152/417 |
| 6,182,727 B1 * | | 2/2001 | Beesley | B60C 23/003 152/417 |
| 6,199,611 B1 * | | 3/2001 | Wernick | B60C 23/003 152/417 |
| 6,283,186 B1 * | | 9/2001 | Krisher | B60C 23/003 152/417 |
| 6,363,985 B1 * | | 4/2002 | Beesley | B60C 23/003 152/415 |
| 6,575,269 B1 * | | 6/2003 | Skoff | B60C 23/003 152/416 |
| 6,668,888 B1 * | | 12/2003 | Beesley | B60C 23/003 152/415 |
| 6,857,457 B2 | | 2/2005 | Nienhaus | |
| 7,255,481 B2 * | | 8/2007 | Mermoud | B60B 27/00 152/417 |
| 7,416,005 B2 * | | 8/2008 | Hennig | B60C 23/003 152/415 |
| 7,690,412 B1 * | | 4/2010 | Jenkinson | B60C 23/003 152/416 |
| 7,896,045 B2 * | | 3/2011 | Solie | B60C 23/003 152/416 |
| 7,967,045 B2 | | 6/2011 | Jenkinson et al. | |
| 7,997,316 B2 | | 8/2011 | Walter et al. | |
| 8,052,400 B2 * | | 11/2011 | Isono | B60C 23/003 152/417 |
| 2002/0112802 A1 * | | 8/2002 | D'Amico | B60C 23/003 152/415 |
| 2005/0133134 A1 | | 6/2005 | Ingram et al. | |
| 2005/0161137 A1 | | 7/2005 | Hoang | |
| 2008/0185086 A1 | | 8/2008 | Ingram et al. | |
| 2009/0084481 A1 * | | 4/2009 | Kalavitz | B60C 23/003 152/417 |
| 2010/0038004 A1 * | | 2/2010 | Saadat | B60B 1/08 152/427 |
| 2010/0065177 A1 * | | 3/2010 | Saadat | B60C 23/003 152/417 |
| 2014/0261941 A1 * | | 9/2014 | Knapke | B60C 23/003 152/417 |
| 2015/0059945 A1 * | | 3/2015 | Flory | B60C 23/003 152/417 |
| 2015/0068653 A1 * | | 3/2015 | Cis | B60C 23/003 152/417 |
| 2015/0210124 A1 * | | 7/2015 | Hibbler | B60C 23/003 152/417 |
| 2015/0290986 A1 * | | 10/2015 | Tsiberidis | B60C 23/003 152/417 |
| 2015/0352911 A1 * | | 12/2015 | Bittlingmaier | B60C 23/16 152/417 |
| 2015/0367690 A1 * | | 12/2015 | Keeney | B60C 23/003 152/417 |
| 2016/0009148 A1 * | | 1/2016 | Berkness | B60C 23/003 152/417 |
| 2016/0016443 A1 * | | 1/2016 | Morgan | B60C 23/003 152/417 |

* cited by examiner

Fig. 10

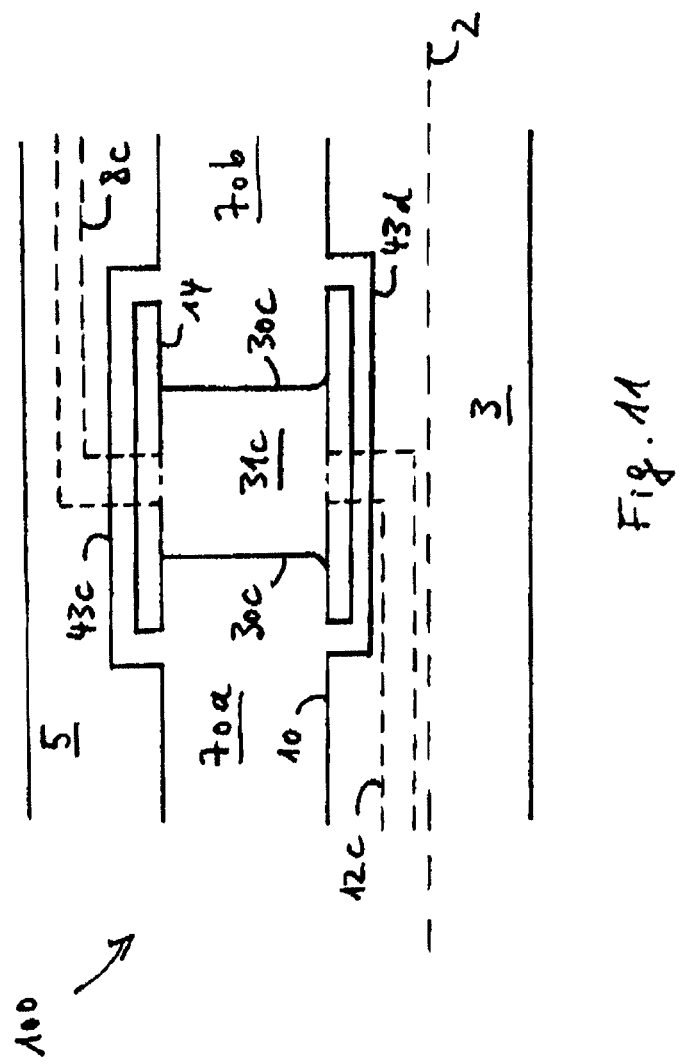

SPINDLE ASSEMBLY FOR A TIRE INFLATION SYSTEM

BACKGROUND OF THE INVENTION

The invention relates to a spindle assembly for a tire inflation system.

Tire inflation systems for industrial or agricultural vehicles such as trucks or tractors are designed to measure and control the fluid pressure of one or several pneumatic tires of the vehicle. Typically, such a tire inflation system comprises a tire fluid pressure control unit including a fluid source and fluid pressure measuring means and fluid lines through which the control unit and the pneumatic tire are in fluid communication with each other. The control unit is configured to inflate and deflate the tire through the fluid lines.

Since it is desirable that the tire can be inflated and deflated during operation of the vehicle, tire inflation systems known from the prior art comprise rotary seal arrangements which are disposed between a vehicle spindle and a wheel hub on which the wheel and the tire are mounted. Said rotary seal arrangements generally include sealing means disposed on the spindle and/or on the wheel hub wherein a first portion of the sealing means is in sliding sealing contact with a second portion of the sealing means, the sealing means thereby forming a dynamical annular seal chamber through which fluid can be transported from the control unit to the rotating tire and vice versa.

Due to high fluid pressure in the fluid lines and in particular in the annular seal chamber, fluid may at times be leaked out of the annular seal chamber. Since contamination of lubricants with the fluid leaked out of the annular seal chamber is to be avoided, means for efficiently leading away the leaked out fluid are required.

US 2008/0314487 A1 relates to the discharging of leakage air from leakage reception spaces which are arranged on axially opposing sides of an annular space. According to an embodiment illustrated in FIG. 5 of US 2008/0314487 A1, the discharging of leakage air from the reception spaces can be realized by means of bores which are arranged in a sheet metal ring of a seal housing. However, in this arrangement leakage air can be discharged only in the absence of filling air pressure, thereby limiting the use of the described seal arrangement.

BRIEF SUMMARY OF THE INVENTION

It is therefore an object of the present invention to suggest a spindle assembly for a tire inflation system comprising means for efficiently draining fluid leaked out of fluid lines, and in particular for efficiently draining fluid leaked out of an annular seal chamber to a fluid drain, for example an external environment, in which the draining can be carried out more flexibly.

This problem is solved by a spindle assembly for a tire inflation system according to claim 1. Special embodiments are described in the dependent claims.

Thus, a spindle assembly for a tire inflation system is proposed, the spindle assembly comprising:
a spindle defining an axial direction and comprising a fluid conduit;
a rotatable part rotatably mounted on the spindle and comprising a fluid passage, the fluid passage being configured to be in fluid communication with a pneumatic tire;
a dynamic annular seal chamber, the annular seal chamber being disposed radially between the spindle and the rotatable part;
wherein the fluid conduit and the fluid passage are in fluid communication with each other through the annular seal chamber, the annular seal chamber being disposed axially between a first volume and a second volume; and
wherein the first volume and the second volume are in fluid communication with each other through a fluid channel, the fluid channel being configured to lead fluid leaked out of the annular seal chamber and leaked into the first volume and/or leaked into the second volume through the fluid channel. A first end of the fluid channel ends in the first volume, a second end of the fluid channel ends in the second volume, and the fluid channel leads around the annular seal chamber.

Due to the fact that the first volume and the second volume are in fluid communication with each other through the at least one fluid channel, fluid leaked out of the dynamic annular seal chamber on either side of the dynamic annular seal chamber can be efficiently led away. This way, unwanted mixing of the leaked out fluid with lubricant used for lubricating rotating components of the spindle assembly can be efficiently reduced or prevented. As a first end of the fluid channel ends in the first volume, a second end of the fluid channel ends in the second volume, and the fluid channel leads around the annular seal chamber, leaked out fluid can be drained also in a pressurized state of the seal chamber. Thus, as compared to known tire inflation systems a flexibility and versatility of the system is advantageously increased. Also, since the fluid channel fluidly connects the first volume and the second volume, the number of draining channels between the volumes and e.g. the external environment is advantageously reduced.

The dynamic annular seal chamber is dynamic in that sealing means forming the dynamic annular seal chamber are configured to be in sliding sealing contact with each other at least partially. Preferably, the first volume and the second volume are directly adjacent to the annular seal chamber and are each arranged on a different side of the annular seal chamber along the axial direction. In other words, the first volume and the second volume are preferably arranged on axially opposing sides of the annular seal chamber. The fluid channel can be arranged internal to the spindle and/or internal to the rotatable part. Then, a first end of the fluid channel ends in the first volume and a second end of the fluid channel ends in the second volume, thereby fluidly connecting the first and the second volume.

The spindle can be a front axle or a rear axle of a vehicle, preferably for agricultural or for industrial applications, such as a tractor or a wheel loader. Also, the spindle can be used with or without traction, that is the spindle can be stationary or rotatable with respect to the vehicle. In a particular embodiment, the spindle can be coupled to a reduction gear, such as a planetary reduction gear. The spindle defines an axis of rotation about which the rotatable part is configured to rotate, the axis of rotation defining the axial direction or z-direction, wherein the positive z-direction is defined as pointing away from the vehicle. Directions perpendicular to the axial direction are radial directions, a positive radial direction being defined as pointing away from the z-axis.

In the following, the terms "inner" and "outer" are defined to refer to the radial direction. That is, an inner peripheral side of any component described herein is a side of that component that faces the z-axis. An outer peripheral side, on the other hand, is a side that is averted from the z-axis. Similarly, the terms "internal" and "external" are defined to refer to the axial direction. That is, an internal side or end of any component mentioned herein points in the negative z-direction, whereas an external side or end points in the positive z-direction.

Importantly, the fluid channel for leading away the leaked out fluid is not in fluid communication with the annular seal chamber, the fluid conduit or the fluid passage which are or may be used for inflating and/or deflating the pneumatic tire. In other words, the fluid channel is fluidly separated from the annular seal chamber, from the fluid conduit and from the fluid passage.

The fluid conduit comprised by the spindle is typically configured to be in fluid communication with a tire pressure control unit of the tire inflation system. The tire pressure control unit can comprise, inter alia, a fluid source, a fluid drain and one or several control valves. Similarly, the fluid passage comprised by the rotatable part can be fluidly connected to the pneumatic tire via one or several valves, e.g. a retaining valve. Inflation of the tire can be realized by leading pressurized fluid, such as air, from the fluid source to the pneumatic tire via the fluid conduit, the annular seal chamber and the fluid passage. Likewise, the tire can be deflated by leading fluid from the tire to the fluid drain through the same fluid lines, namely the fluid passage, the annular seal chamber and the fluid conduit, but in the opposite direction. In an alternative embodiment, the tire can comprise a valve which is preferably arranged at a rim of the tire and which is in fluid communication with the fluid passage, so that the valve can be manipulated by means of a change of pressure in the fluid passage. E.g., said valve can be opened by a low pressure in the fluid passage, the annular seal chamber and the fluid conduit for deflating fluid from the tire through the valve to an external environment or to an additional vent.

In a special embodiment, the spindle assembly can comprise a rotatable member which is preferably mounted on an inner peripheral side of the rotatable part. Like the rotatable part, the rotatable member is configured to rotate about the axis of rotation defined by the spindle, and the annular seal chamber is preferably disposed radially inside an inner peripheral end of the rotatable member between the rotatable member and the spindle. The rotatable member then comprises at least one through hole for fluidly connecting the fluid passage with the annular seal chamber. Preferably, the fluid channel is configured as an opening or as a through boring which extends through the rotatable member, typically along the axial direction.

It is also conceivable that the rotatable member is mounted on an outer peripheral side of the spindle. Then, the annular seal chamber is preferably disposed radially outside an outer peripheral end of the rotatable member between the rotatable member and the rotatable part.

In this embodiment, the through hole preferably fluidly connects an inner peripheral side or an inner peripheral end of the rotatable member with an outer peripheral side or an outer peripheral end of the rotatable member. That is, the through hole preferably extends through the rotatable member along the radial direction. The through hole can be configured as any suitable type of channel or opening extending through the rotatable member. The fluid channel, on the other hand, preferably establishes fluid communication between axially opposing sides or axially opposing ends of the rotatable member, thereby being configured to lead fluid that is leaked out of the dynamic annular seal chamber across the rotatable member and/or around the annular seal chamber in the axial direction.

Preferably, the dynamic annular seal chamber and the through hole are arranged in series. In other words, the annular seal chamber and the through hole are typically configured as serial fluid lines. That is, fluid led from the fluid conduit to the fluid passage is preferably led sequentially at first through the dynamic annular seal chamber and subsequently through the through hole or vice versa.

The rotatable part can be a wheel hub. The rotatable member can be a cartridge-like component. Typically, the rotatable part and/or the rotatable member are at least partially made of metal. Preferably, both are entirely made of metal. Also, it is conceivable that the rotatable member comprises a plastic material. In other words, the rotatable member can be made partially or entirely of a plastic material. The rotatable part and/or the rotatable member generally have an at least partially ring-like shape or a shape which at least partially resembles a hollow cylinder. Both the rotatable part and the rotatable member are then in concentric arrangement with respect to the z-axis and with respect to each other, the rotatable member being disposed radially inside the rotatable part.

Typically, the sealing means forming the annular seal chamber are arranged radially—that is along the radial direction—between the inner peripheral end of the rotatable member and the spindle. Usually, the sealing means are then at least partially mounted on or attached to the inner peripheral end or the inner peripheral surface of the rotatable member. Likewise, the sealing means are usually at least partially mounted on or attached to the spindle or, more specifically, to an outer peripheral surface of the spindle.

A flexibility and a versatility of the spindle assembly can be advantageously increased if there is an additional set of fluid lines providing fluid communication between the spindle and the rotatable part. To that end, a special embodiment provides that the spindle comprises at least one second fluid conduit; the rotatable part comprises at least one second fluid passage; at least one second rotatable member is preferably mounted
  on the inner peripheral side of the rotatable part, a second annular seal chamber then being disposed radially inside an inner peripheral end of the second rotatable member between the second rotatable member and the spindle, wherein the second rotatable member comprises at least one second through hole for fluidly connecting the second fluid passage with the second annular seal chamber;
wherein the second fluid conduit and the second fluid passage are in fluid communication with each other through the second annular seal chamber, the second annular seal chamber being disposed axially between the second volume and a third volume; and
wherein the second volume and the third volume are in fluid communication with each other through at least one second fluid channel for leading fluid leaked out of the second annular seal chamber and leaked into the second volume and/or into the third volume through the second fluid channel,
wherein the second fluid channel is preferably configured as an opening or as a through boring in the second rotatable member.

Like the first fluid channel, the second fluid channel can alternatively or additionally be arranged internal to the spindle and/or internal to the rotatable part. Also, as explained with respect to the previously described (first) rotatable member, the second rotatable member can alternatively be mounted on the outer peripheral side of the spindle. In that case, the second annular seal chamber is preferably disposed radially outside an outer peripheral end of the second rotatable member between the second rotatable member and the rotatable part. The (first) rotatable member and the second rotatable member are axially spaced with respect to each other.

Due to the fact that the fluid channel and the second fluid channel are in fluid communication with each other for leading away fluid leaked out of the annular seal chamber and fluid leaked out of the second annular seal chamber, fluid leaked out on all sides of the rotatable member and the second rotatable member and in particular also fluid leaked out in between the rotatable member and the second rotatable member can be efficiently drained through the fluid channel and/or the second fluid channel.

Preferably the fluid conduit, the fluid passage and the fluid passageway are fluidly separated from the second fluid conduit, the second fluid passage and the second fluid passageway. The second fluid conduit can be configured to be in fluid communication with the above described tire pressure control unit. The second fluid passage can be configured to be in fluid communication with the pneumatic tire. The second fluid passage can be used for piloting a retaining valve that requires an external pneumatic signal, the formerly described (first) fluid passage being in fluid connection with the same retaining valve. That is, fluid in the second fluid passage can be used for controlling the flow of fluid in the formerly described (first) fluid passage.

Features described in connection with the fluid conduit, the fluid passage, the rotatable member, the fluid channel, the through hole, the sealing means and the annular seal chamber may be correspondingly combined with the second fluid conduit, the second fluid passage, the second rotatable member, the second fluid channel, the second through hole, the second sealing means and the second annular seal chamber, respectively.

Another special embodiment directed to the effective draining or leading away of fluid leaked out of the annular seal chamber is characterized by a breather line arranged on the rotatable part or internal to the rotatable part, the breather line being in fluid communication with the fluid channel and/or the breather line being configured to lead the fluid leaked out of the annular seal chamber to an external environment. Typically, the breather line directly ends in the first volume, the second volume or the third volume. The breather line can be in direct fluid communication with the external environment. More typically, the breather line comprises a control valve configured to exhaust the leaked out fluid if a pressure of the leaked out fluid exceeds a threshold. If, on the other hand, the pressure of the leaked out fluid is below the threshold, the control valve seals the breather line from the external environment.

In a further special embodiment, the rotatable member is fixedly mounted on the rotatable part such that a relative radial motion and a relative rotational motion of the rotatable member with respect to the rotatable part is blocked or prevented. In other words, the rotatable part and the rotatable member are configured to co-rotate about the z-axis. Wear of the rotatable part and the rotatable member at an interface of the rotatable part and the rotatable member is advantageously avoided. Likewise, wear of sealing members arranged radially between the rotatable part and the rotatable member can be reduced. The tight mounting of the rotatable member on the rotatable part can be realized in that the inner peripheral surface of the rotatable part and the outer peripheral surface of the rotatable member have at least partially corresponding shapes and are in a preferably precisely machined form-fit with each other. Also, the rotatable part and the rotatable member can be fixed to each other by means of one or several mechanical connection members such as screws, bolts or rivets.

A further embodiment provides that at least 5 percent, at least 10 percent, at least 15 percent or at least 20 percent of the outer peripheral surface of the rotatable member is in direct mechanical contact with and tightly fitted on the inner peripheral surface of the rotatable part for conducting heat from the rotatable member to the rotatable part. This way, heat produced by the sealing means when at least a portion of the sealing means is in sliding sealing contact with another portion of the sealing means is efficiently dissipated from the rotatable member to the rotatable part. Heat conductance from the rotatable member to the rotatable part is particularly effective if the rotatable part and the rotatable member are made of metal or if at least the sections of the surfaces of the rotatable part and the rotatable member which are in direct mechanical contact with each other are made of a metal material.

According to a further special embodiment, the sealing means comprise a bushing, preferably a metal bushing, mounted on the spindle, there being a radial clearance between the spindle and the bushing along an axial extension of the bushing. In other words, at least in an axial section of the spindle in which the bushing is mounted on the spindle, an outer diameter of the spindle is slightly smaller than an inner diameter of the bushing, e.g. by less than one percent or by less than 0.1 percent of the inner diameter of the bushing. The diameters can differ by less than one millimeter, by less than half a millimeter or by less than a tenth of a millimeter. Thus, mounting of the bushing on the spindle and/or exchanging the bushing is facilitated.

In this embodiment, the bushing or a portion of an outer peripheral surface of the bushing preferably forms an inner peripheral portion of the annular seal chamber. Typically, additional seal rings such as rubber rings or o-rings are disposed radially between the bushing and the spindle. Also, the bushing preferably comprises at least one radial-through hole for fluidly connecting the fluid conduit of the spindle with the annular seal chamber. Preferably, sealing members such as o-rings are typically arranged between the outer peripheral surface of the spindle and an inner peripheral surface of the bushing, for example in order to seal a fluid connection between the fluid passage and the annular seal chamber.

The bushing can feature an annular indentation formed in an inner peripheral surface of the bushing, the annular indentation thereby forming an annular fluid channel between the bushing and the spindle. Also, the bushing can feature a radial through hole extending through the bushing in the radial direction. Typically, the annular indentation and the radial through hole fluidly connect the fluid conduit with the annular seal chamber. Through the annular fluid channel formed by the annular indentation, fluid communication between the fluid conduit and the annular seal chamber is provided for arbitrary angular orientations of the bushing with respect to the spindle, thereby rendering the arrangement more flexible.

A further embodiment is characterized by corresponding mechanical features arranged in or on the outer peripheral surface of the spindle and in or on the inner peripheral surface of the bushing, the corresponding mechanical features being in mechanical engagement such as to block a relative rotational motion of the bushing with respect to the spindle. Said corresponding mechanical features can comprise a first recess in the outer peripheral surface of the spindle, a second recess in the inner peripheral surface of the bushing and a mechanical key, wherein the mechanical key is configured to be completely or at least partially received in the first recess and, simultaneously, to be completely or at least partially received in the second recess. Preferably, the recesses and the mechanical key have precisely machined corresponding shapes and are in a form-fit such as to allow minimal rotational play between the bushing and the spindle. More specifically, the first recess and/or the second recess can be configured as a spot face, a bore or a slot and the mechanical key can be configured as a metal sphere, a metal gudgeon, a Woodruff key or a feather key.

The sealing means can additionally comprise a pair of annular sealing lips mounted on an inner peripheral end of the rotatable member, the annular sealing lips being in sliding sealing contact with the outer peripheral surface of the bushing. The annular sealing lips are then axially spaced with respect to each other, thereby enclosing and sealing the annular seal chamber at least along the axial direction. That is, the annular seal chamber is defined by or formed by at least a portion of the inner peripheral surface of the rotatable member, the annular sealing lips and at least a portion of the outer peripheral surface of the bushing. The annular sealing lips are preferably made of a flexible material such as plastic or rubber, polytetrafluoroethylene (PTFE) being an example material. The annular sealing lips can be clamped into or onto the inner peripheral end or the inner peripheral surface of the rotatable member. Alternatively, the annular sealing lips can be glued to the inner peripheral end or the inner peripheral surface of the rotatable member.

In an alternative embodiment in which the sealing means are realized without the bushing, the sealing means comprise an annular collar preferably made of metal and mounted on an outer peripheral surface of the spindle; an annular plastic component mounted on an inner peripheral surface of the rotatable member and received in the metal collar; and a flexible seal ring arranged between the metal collar and the plastic component.

More specifically, in this embodiment the annular seal chamber is formed by sealing means which comprise:
  an annular collar mounted on an outer peripheral surface of the spindle;
  an annular plastic component mounted on an inner peripheral surface of the rotatable member and at least partially received in the collar, an axial cross section of the annular plastic component having an approximately U-like shape, the rounded end of the U-like shape pointing towards the spindle axis; and
  a pair of non-closed flexible seal rings arranged between the collar and the plastic component on axially opposing sides of the annular plastic component.

Preferably, the annular collar is not in contact with the annular plastic component such that friction between the annular collar and the annular plastic component is reduced or completely avoided.

Preferably, the annular collar, the annular plastic component and the non-closed flexible seal rings are dimensioned such that, when the seal chamber is not pressurized, the non-closed seal rings clasp around the annular collar and are not in contact with the annular plastic component. That is, according to this embodiment, when the seal chamber is not pressurized, there is no friction between the annular plastic component on the one hand and the non-closed seals rings and the annular collar on the other.

Preferably, the annular collar, the annular plastic component and the non-closed flexible seal rings are furthermore dimensioned such that, when the seal chamber is pressurized, the non-closed seal rings are forced radially outward (this being facilitated by their being non-closed), such that the non-closed seal rings are each arranged axially between the annular plastic component and the annular collar and are each pressed against the annular collar and the annular plastic component, thereby sealing the seal chamber.

In this embodiment, the seal chamber is configured to be formed by or enclosed by the annular plastic component, the annular collar and the flexible seal ring. More Specifically, the sealing means can be configured such that, when the seal chamber is pressurized, the seal ring is pressed against the plastic component and against the metal collar so that the plastic component is in sliding sealing contact with the seal ring, the seal ring thereby sealing the annular seal chamber; and the sealing means can be configured such that, when the seal chamber is not pressurized, the flexible ring clasps around the metal collar so that the plastic component is not in contact with the seal ring. In other words, when the annular seal chamber is not pressurized, there is no friction or only minimal friction between the rotatable plastic component on one hand and the collar and the seal ring on the other. Thus, wear of the sealing means is advantageously reduced. Preferably, a cross section of the plastic component taken along a plane comprising the z-axis has a U-like shape, the round end of the U pointing in the negative radial direction towards the z-axis. Preferably, the seal ring is not a closed ring but features a cut, the cut allowing a radius of the seal ring to increase more easily when the seal chamber is pressurized. The seal ring typically comprises at least one radial through hole or opening for fluidly connecting the annular seal chamber with the fluid passage of the spindle.

Another special embodiment provides that the rotatable part is mounted on the spindle by means of a pair of bearings, wherein the bearings are axially spaced with respect to each other and wherein the rotatable member and the sealing means are arranged axially between the bearings. Generally, also the rotatable member is arranged between the pair of bearings along the axial direction. More specifically, the rotatable member can be entirely or at least partially disposed in an axial section extending between the bearings.

To prevent that fluid leaked out of the annular seal chamber mixes with lubricant used for lubricating the bearings, the spindle assembly can additionally include a pair of annular oil seals, the oil seals sealing the annular seal chamber from the bearings. The oil seals are typically configured as rubber rings which are axially spaced with respect to each other, the annular seal chamber being disposed axially between the oil seals. Preferably, the rotatable member and, if applicable, the second rotatable member are also arranged axially between the oil seals. Along the radial direction, the oil seals can be disposed between the spindle and the rotatable part or between the bushing and the rotatable part. Preferably, the oil seals and the rotatable member are configured as separate components. That is, the oil seals are not integrated into the rotatable member. This way, the oils seals can be exchanged separately, if necessary.

The oil seals usually define or enclose a sealed space, typically of annular shape, inside which the annular seal chamber is arranged. Said sealed space typically comprises the first volume, the second volume and the third volume, if applicable. Fluid leaked out of the annular seal chamber is then leaked into the sealed space. It is therefore particularly advantageous if a breather line for draining the leaked out fluid, such as the breather line comprised by the rotatable part described above, is in fluid communication with the sealed space. Preferably, the breather line directly ends in the sealed space. The rotatable member and the sealing means typically divide the sealed space in two separate sections, said sections being situated axially on opposite sides of the rotatable member and/or the sealing means. The fluid channel advantageously establishes a fluid connection between these sections, thereby allowing leaked out fluid in both sections to be led away by the breather line. In other words, due to the fluid channel a single breather line is sufficient for efficiently draining the fluid leaked out of the annular seal chamber.

A further special embodiment provides that the fluid conduit is completely or at least partially disposed internal to the spindle and/or the fluid passage is completely or at least partially disposed internal to the rotating part. Preferably, at least an end section of the fluid conduit proximal to the fluid passageway is disposed internal to the rotatable part and/or at least an end section of the fluid passage proximal to the fluid passageway is disposed internal to the spindle. Internally disposed fluid lines are less prone to damage and are therefore advantageous over externally arranged fluid lines known from the prior art.

BRIEF DESCRIPTION OF THE DRAWINGS

Embodiments of the invention will now be described by way of example with reference to the accompanying drawings in which FIG. 10 shows a detail of FIG. 9, and FIG. 11 shows a detail of an axial cross-sectional view of a further embodiment of a spindle assembly.

DETAILED DESCRIPTION OF THE INVENTION

Figure 1:
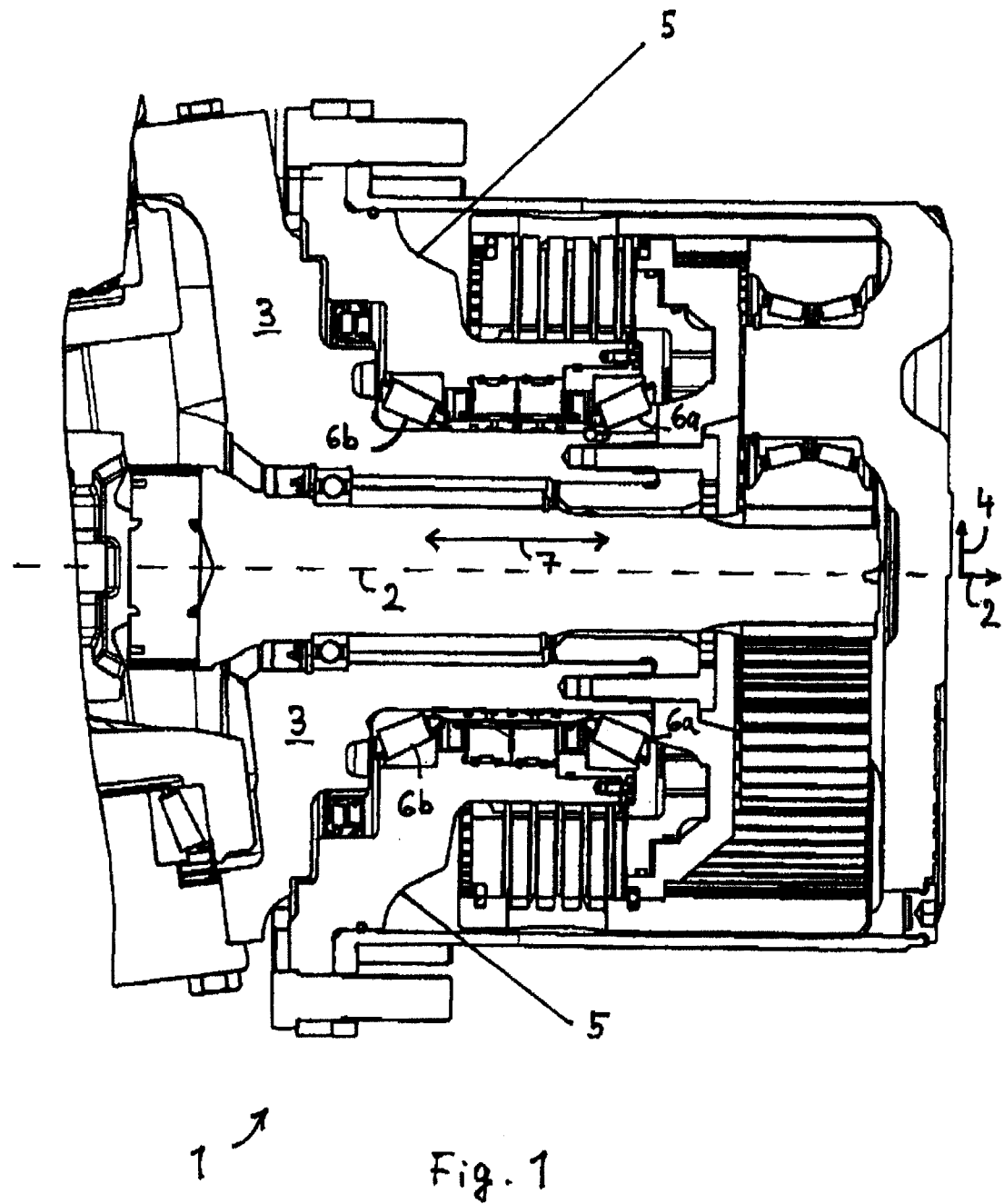
FIG. 1 shows a first axial cross-sectional view of a spindle assembly according to a first embodiment.

FIG. 1 illustrates a first axial cross-sectional view of a spindle assembly 1 for a tire inflation system, wherein the term "axial" denotes that the cross-sectional view is taken along a cross-sectional plane which comprises a z-axis 2 of a cylindrical coordinate system, wherein the z-axis 2 is defined by a symmetry axis of a spindle 3. The arrow on the z-axis 2 defines a positive z-direction pointing to the right in FIG. 1. A radial axis 4 of the cylindrical coordinate system is perpendicular to the z-axis 2. The arrow on the radial axis 4 points away from the z-axis 2, thereby defining a positive radial direction. The stationary spindle 3 is part of a front axle of a tractor (not shown). A wheel hub 5 is made of steel or of another iron-based material and is rotatably mounted on the stationary spindle 3 by means of a pair of roller bearings comprising an external bearing 6a and an internal bearing 6b. The essentially cylindrically symmetric wheel hub 5 is arranged concentrically with respect to the z-axis 2 and can rotate about the z-axis 2. The bearings 6a and 6b are spaced with respect to each other along the z-axis 2, their mutual distance along the z-axis 2 defining an axial section 7 with a length of approximately 8 cm. Further details of the spindle assembly 1 related to the tire inflation system are illustrated in the following figures.

Figure 2:
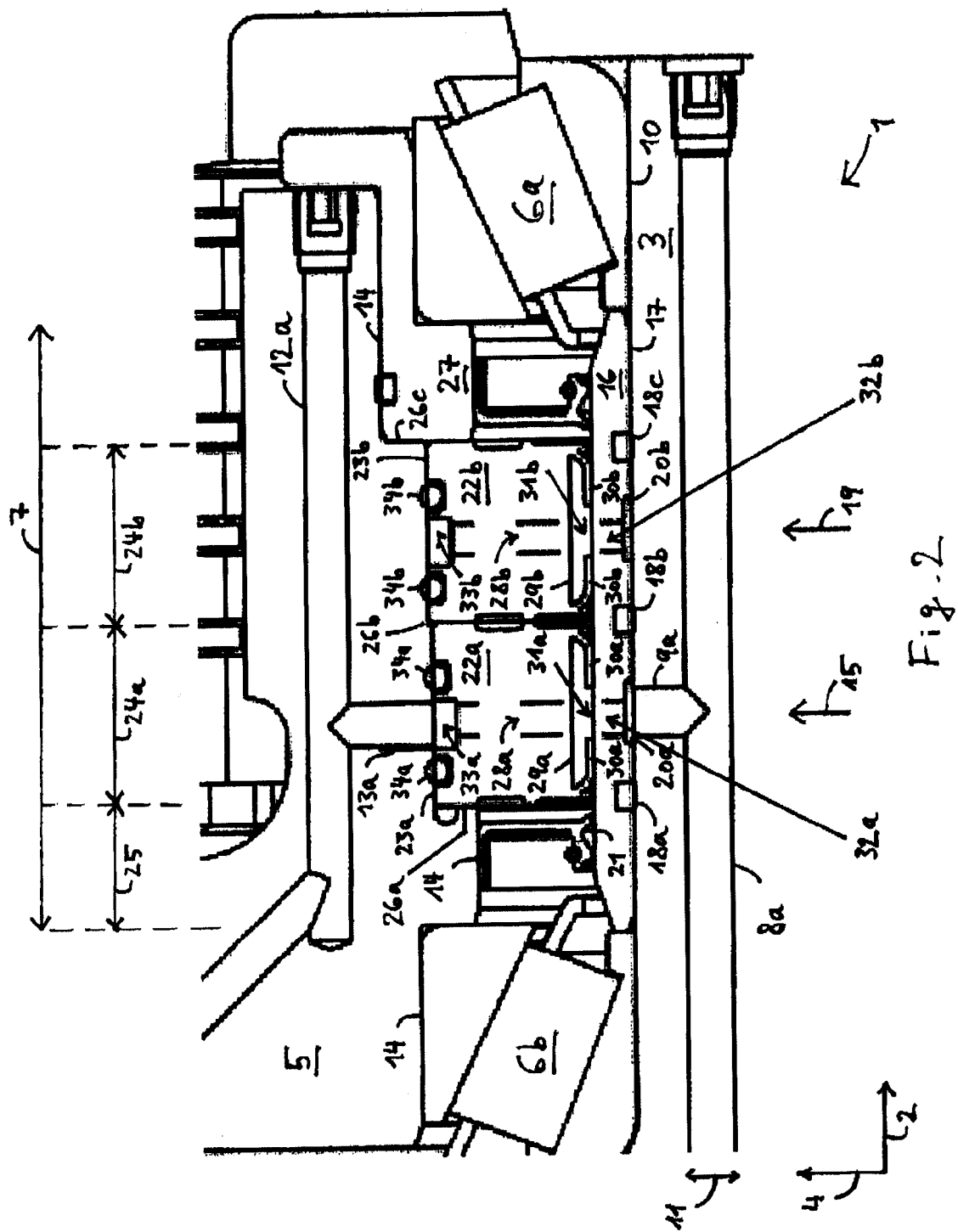
FIG. 2 shows a detail of a second axial cross-sectional view of the spindle assembly of FIG. 1.

FIG. 2 depicts a detail of a second axial cross-sectional view of the spindle assembly 1, the second axial cross-sectional view of FIG. 2 being tilted with respect to the first axial cross-sectional view of FIG. 1 by a given polar angle. Here and in the following, recurring features are designated with identical reference numerals. FIG. 2 shows a fluid conduit 8a disposed internal to the spindle and extending in the z-direction. The first fluid conduit 8a ends in a port 9a which is arranged at an outer peripheral surface 10 of the spindle 3. The first fluid conduit 8a is configured to be in fluid communication with a tire inflation control unit which includes a high pressure air source (not shown). A diameter 11 of the first fluid conduit 8a is about 0.6 cm. Similarly, the wheel hub 5 comprises a first fluid passage 12a which is disposed internal to the wheel hub 5. The first fluid passage 12a ends in a port 13a which is arranged at an inner peripheral surface 14 of the wheel hub 5, the ports 9a and 13a being situated at the same first axial position 15 along the z-axis 2. The first fluid passage 12a is configured to be in fluid communication with a pneumatic tire mounted on the front axle of the tractor.

In the axial section 7 a metal bushing 16 is mounted on the spindle 3, the bushing 16 extending over the entire axial length of the axial section 7. An inner radius of the bushing has a length of approximately 10 cm and thus by about 0.5 mm larger than a radius of the spindle 3 on which the bushing 16 is mounted, resulting in a small radial clearance in between the inner peripheral surface 17 of the bushing and the outer peripheral surface 10 of the spindle 3 over an entire axial length of the bushing. O-rings 18a, 18b and 18c are disposed radially between the spindle 3 and the bushing 16 and are partially received in corresponding annular recesses in the inner peripheral surface 17 of the bushing 16, the o-rings functioning as fluid seals. Additionally, at the first axial position 15 and at a second axial position 19 the bushing features a first annular indentation 20a and a second annular indentation 20b which are engraved in the inner peripheral surface 17 of the bushing, the indentations 20a and 20b thereby forming annular fluid channels between the bushing 16 and the spindle 3 (see FIG. 8 for an illustration of the annular fluid channel formed by the annular indentation 20b). Said annular fluid channels are fluidly sealed by the o-rings 18a, 18b and 18c. The first fluid conduit 8a is in fluid communication with the annular channel formed by the annular indentation 20a through the port 9a. Also, fluid communication between the annular indentations 20a and 20b and an outer peripheral surface 21 of the bushing 16 is realized by means of radial through holes 32a and 32b which extend through the bushing 16 in the radial direction 4 and which are indicated by dashed lines in FIG. 2. The radial through holes 32a and 32b are more clearly shown in FIG. 6. Along the spindle axis 2 the bushing 16 is fixed in between the bearings 6a and 6b. Relative rotational motion between the bushing 16 and the spindle 3 is blocked by a mechanical feature described in more detail further below (see FIG. 6).

In the axial section 7 between the roller bearings 6a and 6b, annular metal cartridges 22a and 22b are disposed radially between the wheel hub 5 and the bushing 16. In an alternative embodiment, the cartridges 22a and 22b can be made partially or entirely of a plastic material. Likewise, the cartridges 22a and 22b are disposed radially between the wheel hub 5 and the spindle 3. The first cartridge 22a is fixedly mounted with its outer peripheral surface 23a on the inner peripheral surface 14 of the wheel hub 5. In the same manner, the second cartridge 22b is fixedly mounted with its outer peripheral surface 23b on the inner peripheral surface 14 of the wheel hub 5. Rotational motion of the cartridges 22a and 22b with respect to the wheel hub is thus prevented and the cartridges 22a and 22b are configured to co-rotate along with the wheel hub 5 about the z-axis 2.

Thereby, at least 20 percent of the outer peripheral surface 23a of the first metal cartridge 22a is in direct mechanical contact with and tightly fitted on the inner peripheral surface 14 of the metal wheel hub 5. In the same way, at least 20 percent of the outer peripheral surface 23b of the second metal cartridge 22a is in direct mechanical contact with and tightly fitted on the inner peripheral surface 14 of the metal wheel hub 5. The tightly fitted metal to metal contact between the cartridges 22a and 22b and the wheel hub 5 additionally guarantees efficient heat conduction from the cartridges 22a and 22b to the wheel hub 5.

The tight fit between the cartridges 22a and 22b and the wheel hub 5 is realized through corresponding shapes of the outer peripheral surfaces 23a and 23b of the cartridges 22a and 22b on one hand and of the inner peripheral surface 14 of the wheel hub 5 on the other, the corresponding shapes resulting in a tight form-fit between these components. For example, over at least a portion of an axial section 24a in which the first cartridge 22a is disposed, an outer radius of the first cartridge 22a precisely fits an inner radius of the wheel hub 5. Likewise, over at least a portion of an axial section 24b in which the second cartridge 22b is disposed, an outer radius of the second cartridge 22b precisely fits the inner radius of the wheel hub 5. During assembly, the cartridges 22a and 22b can be brought into the afore-described tight fit with the wheel hub 5 by means of a mechanical press. In other words, the cartridges 22a and 22b are received radially inside the wheel hub 5 and are in tight mechanical engagement with the latter.

It can be clearly seen from FIG. 2 that the inner radius of the wheel hub 5 varies along the axial direction 2. For example, in the different mutually adjacent axial sections 25, 24a and 24b the inner radius of the wheel hub 5 takes on different values, thereby forming a first shoulder 26a and a second shoulder 26b on the inner peripheral side 14 of the wheel hub 5. The first cartridge 22a is braced against the first shoulder 26a and the second cartridge 22b is braced against the second should 26b. In other words, in the axial direction 2 the first cartridge 22a is fixed in between the first shoulder 26a and the second cartridge 22b and the second cartridge 22b is fixed in between the second shoulder 26b and an adapter 27, the adapter 27 itself being fixed in the axial direction 2 in between a third shoulder 26a on the inner peripheral side 14 of the wheel hub 5 and the external bearing 6a.

The first cartridge 22a features at least one through hole 28a, the through hole 28a extending through the cartridge 22a in the radial direction 4. The through hole 28a of the first cartridge 22a extends from an inner peripheral end 29a of the first cartridge 22a to the outer peripheral surface 23a of the first cartridge 22a.

At the inner peripheral end 29a of the first cartridge 22a, the first cartridge 22a features a pair of annular sealing lips 30a which are mechanically clamped to the inner peripheral end 29a of the first cartridge 22a. In the presently described embodiment, the annular sealing lips 30a are made of a PTFE-based material. The annular sealing lips 30a and the inner peripheral end 29a of the first cartridge 22a along with the portion of the outer peripheral surface 21 of the bushing which is arranged in the axial section 24a, form or enclose a first annular seal chamber 31a. The first annular seal chamber 31a is thus disposed radially on the inside of the inner peripheral end 29a of the first cartridge. Likewise, the first annular seal chamber 31a is disposed radially on the outside of the outer peripheral surface 10 of the spindle 3 and radially on the outside of the outer peripheral surface 17 of the bushing 16. When the wheel hub 5 and the cartridge 22a rotates with respect to the bushing 16 and the spindle 3, the sealing lips 30a are in sliding sealing contact with the bushing 16, making the first annular seal chamber 30a a dynamic annular seal chamber.

In a manner similar to the annular indentations 20a and 20b in the inner peripheral surface 17 of the bushing 16, the outer peripheral surface 23a of the first cartridge 22a features an annular indentation 33a which is enclosed on both sides axially by a pair of o-rings 34a, the o-rings 34a thereby enclosing and sealing the annular indentation 33a in the axial direction 2. In analogy to the annular indentations 20a and 20b of the bushing 16, the annular indentation 33a of the first cartridge 22a forms an annular fluid channel disposed radially between the inner peripheral surface 14 of the wheel hub 5 and the outer peripheral surface 23a of the first cartridge 22a. The through hole 28a fluidly connects the first annular seal chamber 30a with the annular indentation 33a of the first cartridge 22a. Fluid communication between the annular indentation 33a of the first cartridge 22a and the first fluid passage 12a internal to the wheel hub 5 is realized through the port 13a of the first fluid passage 12a, the fluid passage 12a ending in the annular indentation 33a of the first cartridge 22a at the port 13a.

Thus, the first fluid conduit 8a internal to the spindle 3 is in fluid communication with the first fluid passage 12a internal to the wheel hub 5 through a first fluid passageway, the first fluid passageway comprising: the port 9a; the first annular indentation 20a of the bushing 16, the indentation 20a being axially sealed by the o-rings 18a and 18b; the through hole 32a in the bushing 16; the dynamic first annular seal chamber 30a; the through hole 28a through the first cartridge 22a; the annular indentation 33a of the first cartridge, the annular indentation 33a being axially sealed by the pair of o-rings 34a; and the port 13a. Notably, all of the fluid lines making up the first passageway are arranged at the same axial position 15 or at least in the same axial section 24a along the spindle axis 2.

Figure 3:
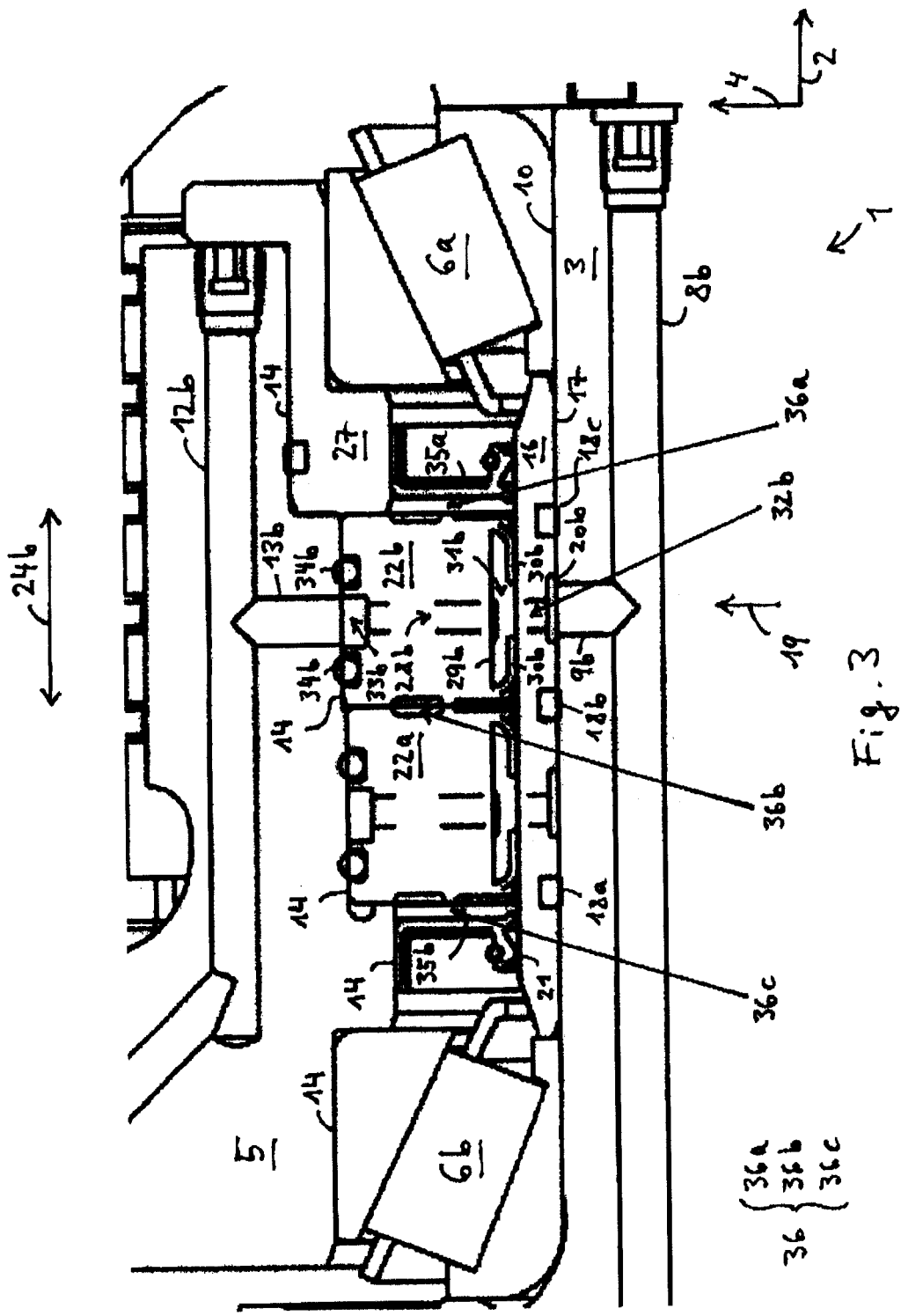
FIG. 3 shows a detail of a third axial cross-sectional view of the spindle assembly of FIG. 1.

FIG. 3 shows a third axial cross-sectional view of the spindle assembly 1. It can be observed that the spindle 3 comprises a second fluid conduit 8b, the second fluid conduit 8b being disposed internal to the spindle 3 and being fluidly separated from the first fluid conduit 8a shown in FIG. 2. Like the first fluid conduit 8a, the second fluid conduit 8b is configured to be in fluid communication with the tire pressure control unit briefly described above. Similarly, the wheel hub 5 comprises a second fluid passage 12b, the second fluid passage 12b being disposed internal to the wheel hub 5 and being fluidly separated from the first fluid passage 12a shown in FIG. 2. In the present embodiment, the second fluid passage 12b is used for piloting a retaining valve, wherein said retaining valve controls a fluid flow through the first fluid passage 12a which is used for inflating and deflating the pneumatic tire. In an alternative embodiment, the second fluid passage 12b is not used for piloting a retaining valve as shown here but is used like the first fluid passage 12a for directly inflating and/or deflating the pneumatic tire.

In analogy to the fluid connection between the first fluid conduit 8a and the first fluid passage 12a, the second fluid conduit 8b and the second fluid passage 12b are in fluid communication through a second fluid passageway, the second fluid passageway comprising: a port 9b at the outer peripheral surface 10 of the spindle 3; the second annular indentation 20b of the bushing 16, the indentation 20b being axially sealed by the o-rings 18b and 18c; a through hole 32b in the bushing 16; a dynamic second annular seal chamber 31b, said second annular seal chamber being formed by the outer peripheral surface 21 of the bushing, a pair of annular sealing lips 30b and an inner peripheral end 29b of the second cartridge 22b; a through hole 28b through the second cartridge 22b; an annular indentation 33b of the second cartridge 22b, the annular indentation 33b being axially sealed by a pair of o-rings 34b; and a port 13b at the inner peripheral surface 14 of the wheel hub 5. All of the fluid lines making up the second passageway are arranged at the same axial position 19 or at least in the same axial section 24b along the spindle axis 2.

Figure 4:
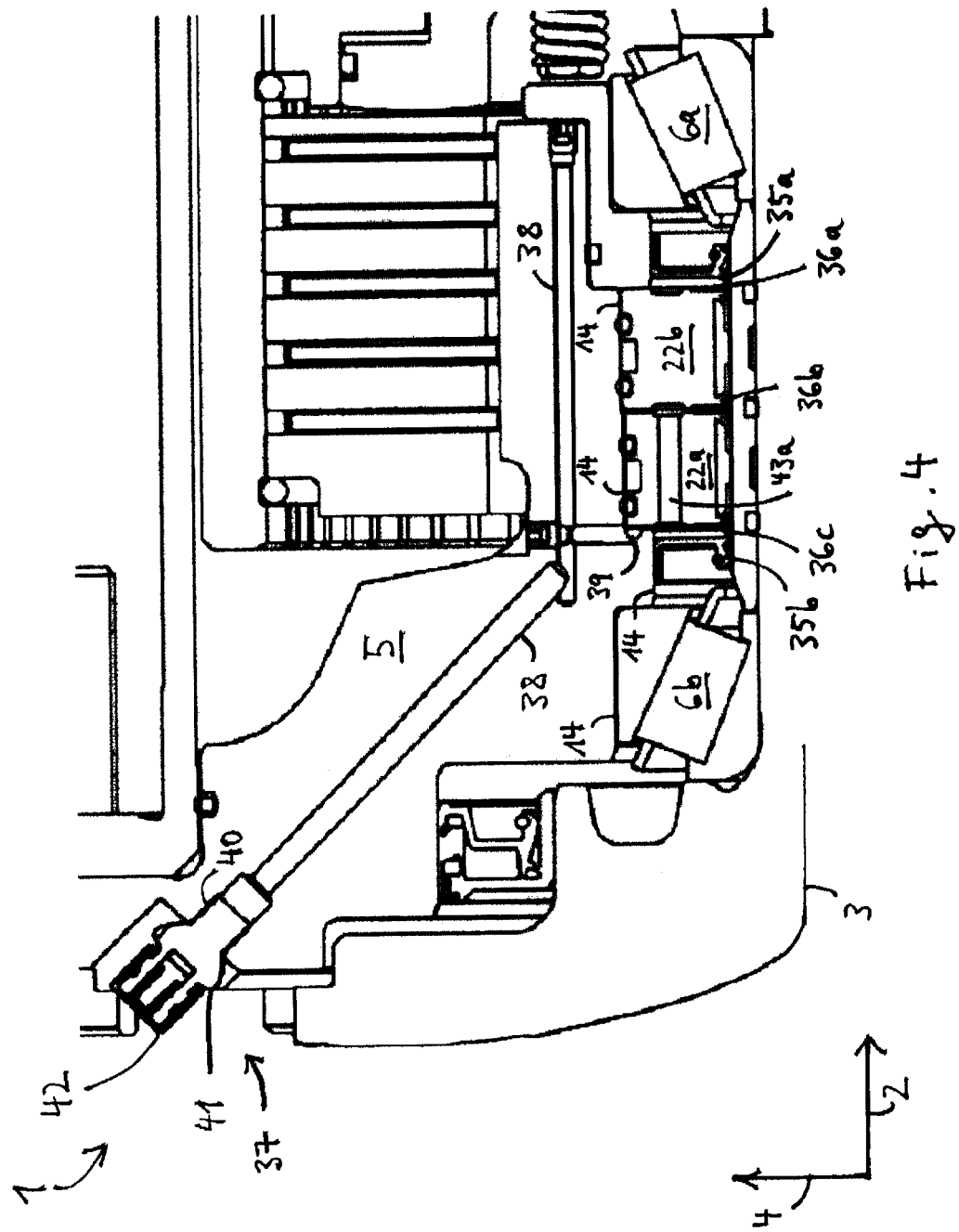
FIG. 4 shows a detail of a fourth axial cross-sectional view of the spindle assembly of FIG. 1.

As can be seen for example in FIG. 4, the spindle assembly 1 additionally shows an external rubber oil ring 35a and an internal rubber oil ring 35b, the oil rings 35a and 35b sealing the dynamic annular seal chambers 31a and 31b as well as the cartridges 22a and 22b from the bearings 6a and 6b. That is, the oil rings 35a and 35b seal the first and the second fluid passageway from the pair of bearings 6a and 6b, thereby preventing the mixing of fluid leaked out of the first or the second fluid passageway with lubricant used for lubricating the bearings 6a and 6b. The oil rings 35a and 35b are axially spaced with respect to each other and are axially disposed between the bearings 6a and 6b. Also, the oil rings 6a and 6b are disposed radially between the wheel hub 5 and the spindle 3. More specifically, the internal oil ring 35b is mounted on the inner peripheral surface 14 of the wheel hub 5 and is in sliding sealing contact with the outer peripheral surface 21 of the bushing 16. The external oil ring 35a, on the other hand, is mounted on the adapter 27. Like the oil ring 35b, the oil ring 35a is in sliding sealing contact with the outer peripheral surface 21 of the bushing 16.

In this manner, the oil rings 35a and 35b, the bushing 16, the adapter 27 and the wheel hub 5 form a sealed chamber 36. The sealed chamber 36 is disposed radially on the inside of the wheel hub 5 and is disposed radially on the outside of the spindle 3, more specifically on the outside of the bushing 16. Thus, the seal chamber 36 is enclosed and sealed by the wheel hub 5, the bushing 16, the adapter 27 and the oil rings 35a and 35b. In the axial direction 2, the first cartridge 22a and the first annular seal chamber 31a on one hand, and the second cartridge 22b and the second annular seal chamber 31b on the other divide the sealed chamber 36 in three compartments 36a, 36b and 36c. The first compartment 36a is disposed axially between the external oil ring 35a and the second cartridge 22b, the second compartment 36b is disposed axially between the second cartridge 22b and the internal first cartridge 22a, and the third compartment 36c is disposed axially between the first cartridge 22a and the internal oil ring 35b.

Since a fluid pressure in the dynamic annular seal chambers 31a and 31b can be between 0 bar and 6 bar, some fluid may be leaked out of the annular seal chambers 31a and 31b and into the compartments 36a, 36b and 36c of the seal chamber 36. In order to avoid additional leaking of this fluid through the oil seals 35a and 35b towards the bearings 6a and 6b, it is advantageous to provide means for leading away the leaked out fluid to an external environment.

Corresponding means for draining the leaked out fluid from the compartments 36a, 36b and 36c to the external environment 37 are illustrated with reference to FIGS. 4-7. FIG. 4 shows a fourth axial cross-sectional view of the spindle assembly 1. For draining leaked out fluid from the compartment 36c to the external environment 37 a breather line 38 is disposed internal to the wheel hub 5. The breather line 38 is in fluid communication with the compartment 36c through a port 39 which is arranged at the inner peripheral surface 14 of the wheel hub 5. Through a port 40 arranged at an external surface 41 of the wheel hub 5 the breather line 38 is configured to be in fluid communication with the external environment 37. A pressure relief valve 42 disposed at the port 40 is configured to exhaust the leaked out fluid to the external environment 37 if a fluid pressure in the breather line 38 exceeds a threshold value.

Notably, a first fluid channel 43a of the first cartridge 22a which extends through the first cartridge 22a along the axial direction 2 fluidly connects the third compartment 36c with the second compartment 36b. The third compartment 36c is a volume which is disposed towards the negative z-direction with respect to the first passageway or with respect to the first dynamic annular seal chamber 31a or with respect to the first cartridge 22a. The second compartment 36b is a volume which is disposed towards the positive z-direction with respect to the first passageway or with respect to the first dynamic annular seal chamber 31a or with respect to the first cartridge 22a. Thus, the first fluid channel 43a bridges or leads across or leads around the first fluid passageway and the first annular seal chamber 31a. Analogously, the second cartridge 22b, too, comprises at least one fluid channel 44b (see FIG. 6) which extends through the second cartridge 22b along the axial direction, thereby fluidly connecting the first compartment 36a with the second compartment 36b.

Figure 5:
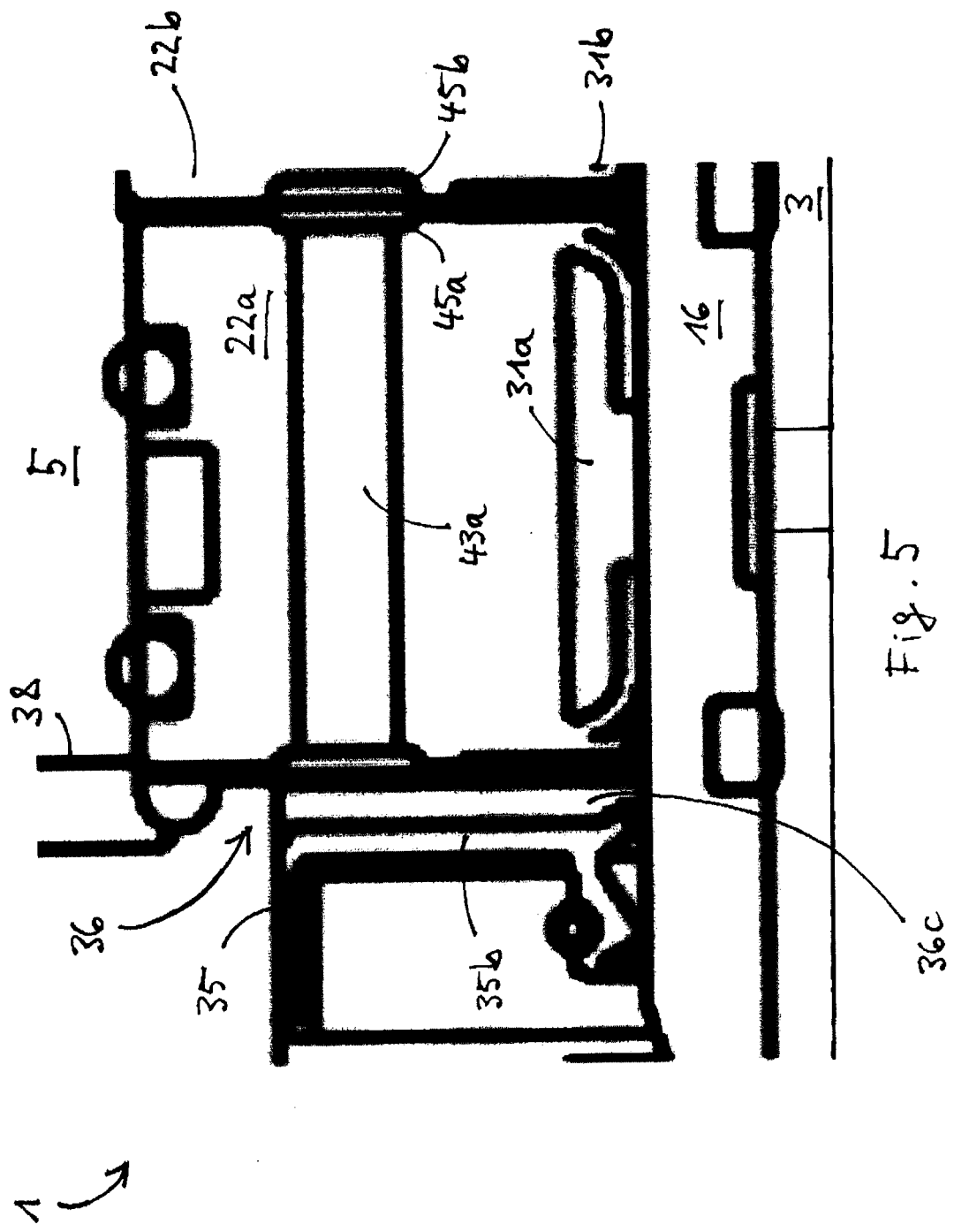
FIG. 5 shows a detail of FIG. 4.

As can be seen in FIG. 5, at a surface of the first cartridge 22a facing the second cartridge 22b, the first cartridge 22a features an annular indentation 45a.

Likewise, at a surface of the second cartridge 22b facing the first cartridge 22a, the second cartridge 22b features an annular indentation 45b. Said annular indentations 45a and 45b form an annular fluid channel disposed axially between the cartridges 22a and 22b, said channel forming part of the second compartment 36b. The axial fluid channel 43a and further axial fluid channels of the first cartridge 22a, such as the fluid channel 44a shown in FIG. 6, end in the annular fluid channel formed by the indentations 45a and 45b. In the same way, the axial fluid channel 44b of the second cartridge 22b (see FIG. 6) and further axial fluid channels of the second cartridge 22b end in the annular fluid channel formed by the indentations 45a and 45b. Thereby, the compartments 36a, 36b and 36c are in fluid communication with each other through the axial fluid channels in the cartridges 22a and 22b and through the annular fluid channel formed by the indentation 45a and 45b.

Figure 6:
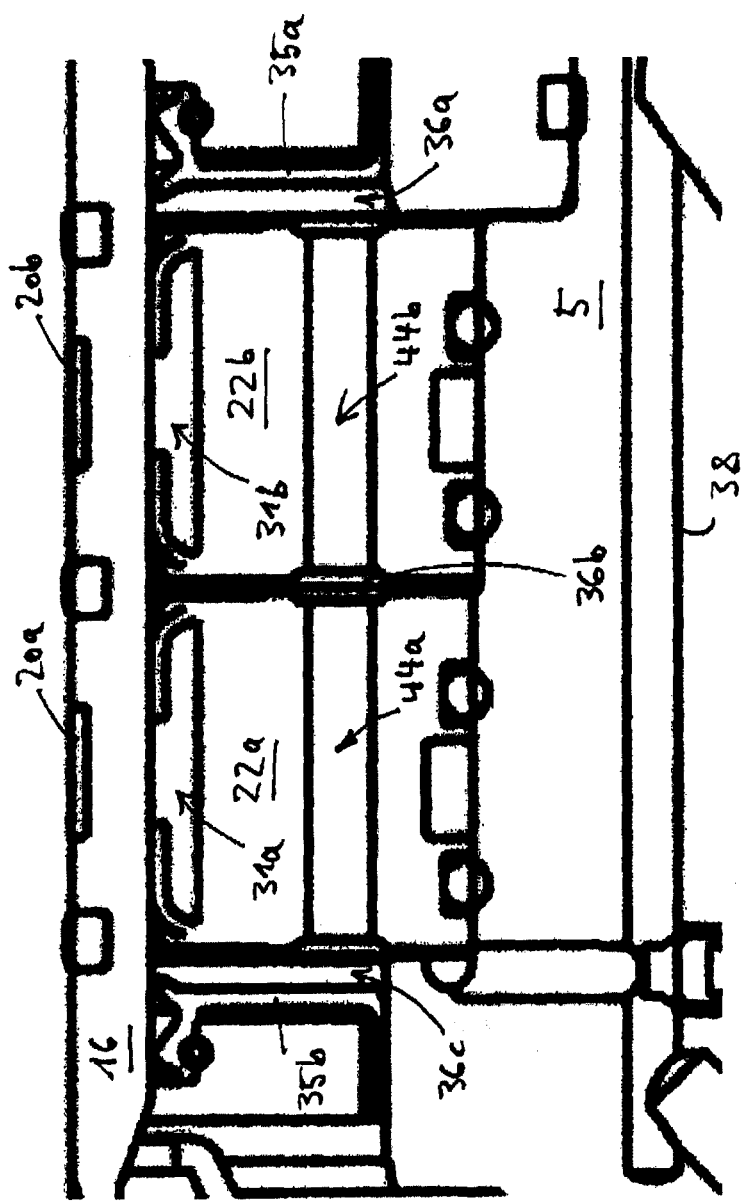
FIG. 6 shows a detail of a fifth axial cross-sectional view of the spindle assembly of FIG. 1.

An illustration of the fluid connection between the compartments 36a, 36b and 36c with the breather line 38 through axial fluid channels 44a and 44b in the cartridge 22a and 22b is given in FIG. 6, FIG. 6 showing a detail of a fifth axial cross-sectional view of the spindle assembly 1. The afore described features related to the axial fluid channels of the cartridge 22a and 22b allow that fluid leaked out of the annular seal chambers 31a and 31b into any of the compartments 36a, 36b and 36c can be efficiently led away to the single breather line 38 and exhausted to the external environment 37. Thus, an unwanted build-up of high fluid pressure in the seal chamber 36 due to leaked out fluid is efficiently prevented.

Figure 7:
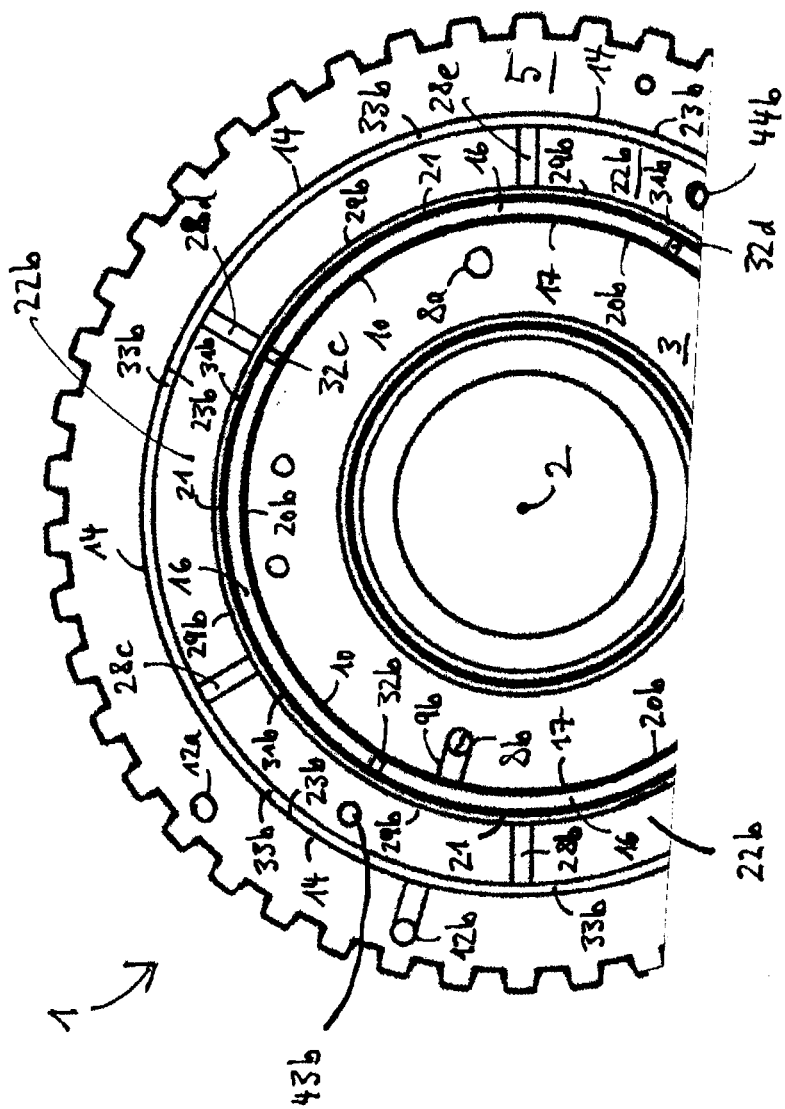
FIG. 7 shows a detail of a radial cross-sectional view of the spindle assembly of FIG. 1 at an axial position depicted in FIG. 3.

A detail of radial cross-sectional view of the spindle assembly 1 corresponding to the axial position 19 (dashed line in FIG. 3) is shown in FIG. 7. Going from the spindle axis 2 radially outward, FIG. 7 shows the spindle 3 with the fluid conduits 8a and 8b, the fluid conduit 8b ending, at the port 9b at the outer peripheral surface 10 of the spindle 3, in the annular channel formed by the annular indentation 20b in the inner peripheral surface 17 of the bushing 16. In the radial direction, the through hole 32b (see FIGS. 2 and 3) and further through holes 32c and 32d in the bushing 16 fluidly connect the conduit 8b with the dynamic annular seal chamber 31b arranged radially in between the outer peripheral surface 21 of the bushing 16 and the inner peripheral end or inner peripheral surface 29b of the second cartridge 22b. The radial through hole 28b (see FIGS. 2 and 3) and further radial through holes 28c, 28d and 28e fluidly connect the dynamic annular seal chamber 31b with the annular channel formed by the indentation 33b in the outer peripheral surface 23b of the second cartridge 22b. Additionally depicted are the axial fluid channels 43b and 44b which extend through the second cartridge 22b in the axial direction 2, that is, perpendicular to the plane of view. Finally, FIG. 7 shows the fluid passages 12a and 12b of the wheel hub 5, the fluid passage 12b ending, at the port 13b at the inner peripheral surface 14 of the wheel hub 5, in the annular channel formed by the annular indentation 33b in the outer peripheral surface 23b of the second cartridge 22b.

Figure 8:
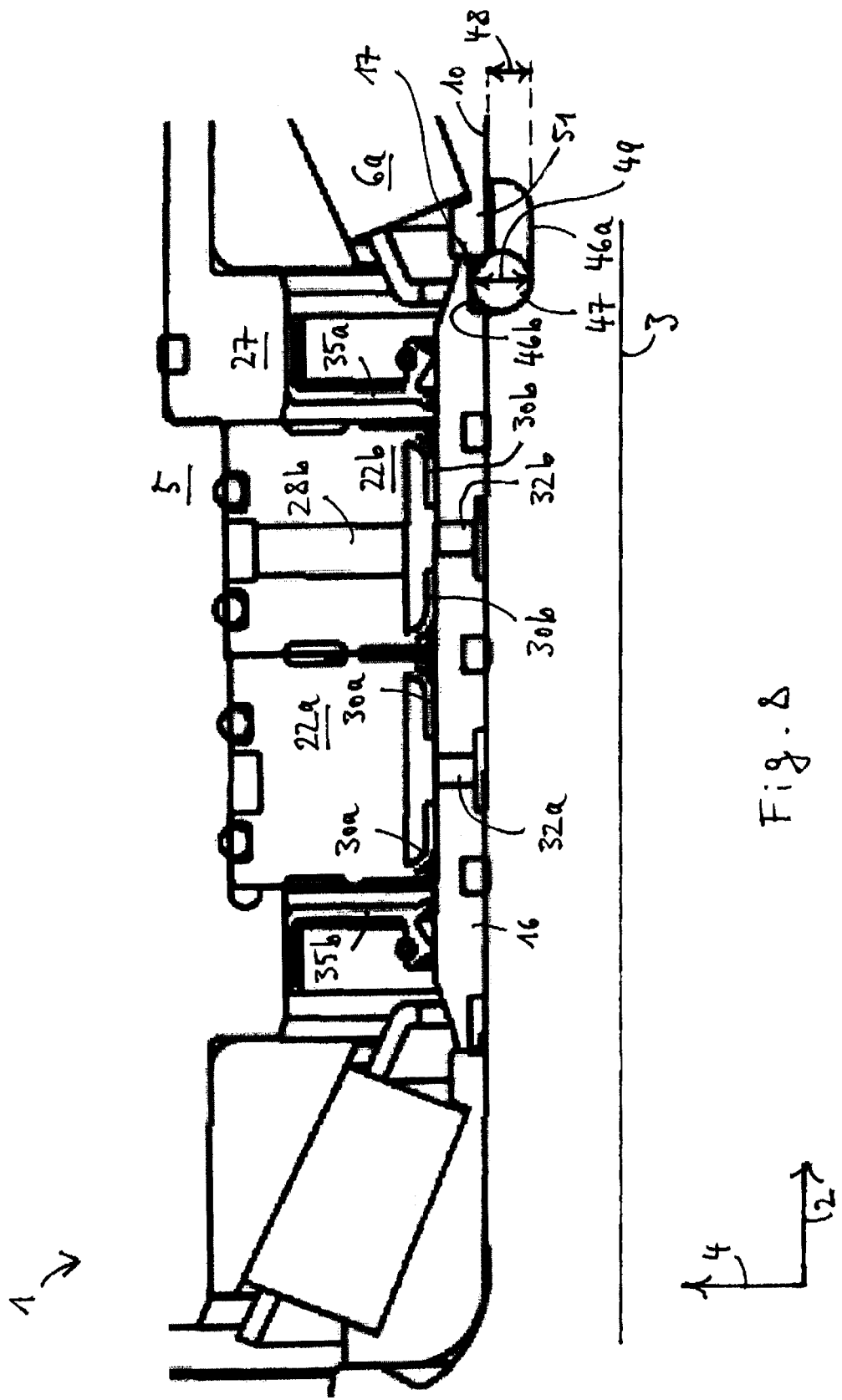
FIG. 8 shows a detail of a sixth axial cross-sectional view of the spindle assembly of FIG. 1.

FIG. 8 depicts a detail of a sixth axial cross-sectional view of the spindle assembly 1. FIG. 8 illustrates features that are not explicitly shown in the previous figures, such as the through holes 32a and 32b in the bushing 16 or the through hole 28b in the second cartridge 22b, the latter merely being shown as dashed lines in FIG. 2. In addition, FIG. 8 shows means for blocking a rotational motion of the bushing 16 with respect to the spindle 3, said means comprising a first recess 46a in the outer peripheral surface 10 of the spindle 3, a second recess 46b in the inner peripheral surface 17 of the bushing 16 and a sphere 47, the sphere 47 being partially received in the first recess 46a and the sphere being partially received in the second recess 46b. Typically, the sphere 47 is made of a metal material, e.g. steel or another iron-based material. In the present example, the recesses 46a and 46b are configured as spot facings. In alternative embodiments they could be realized as bores, slots or any other type of recess. Likewise, a modified embodiment can provide that the sphere 47 is replaced by a metal gudgeon, a Woodruff key, a feather key, preferably all made of a metal material such as steel or iron.

In an angular direction, that is in a direction perpendicular to the cross-sectional area depicted in FIG. 8, the sphere 47 is tightly enclosed by the material of the bushing 16 surrounding the first recess 46a. In other words, at least in the angular direction the sphere and the recess 46a are in a tight and precisely machined form-fit, there being no or only minimal clearance between the bushing 16 and the sphere 47 at least in the angular direction. A depth of the first recess 46a in which the sphere 47 is received has a length 48 that is preferably 70 percent of a diameter 49 of the sphere 47. Along the axial direction 2 an axial length 50 of the recess 46a is about twice the diameter 49 of the sphere 47. Along the axial direction, both the sphere 47 and the bushing 16 are held in place by a mount 51 of the external bearing 6a.

The second recess 46b has a shape which is precisely machined to be in a form-fit with a portion of the sphere 47 protruding from the first recess 46a in the radial direction 4. That is, the sphere 47 and the second recess 46b are in a tight form-fit along the angular direction. Accordingly, a rotational motion of the bushing 16 with respect to the spindle 3 that could be effected, for example, by friction between the pairs of sealing lips 30a and 30b clamped to the cartridges 22a and 22b and the bushing 16 is efficiently blocked.

Figure 9:
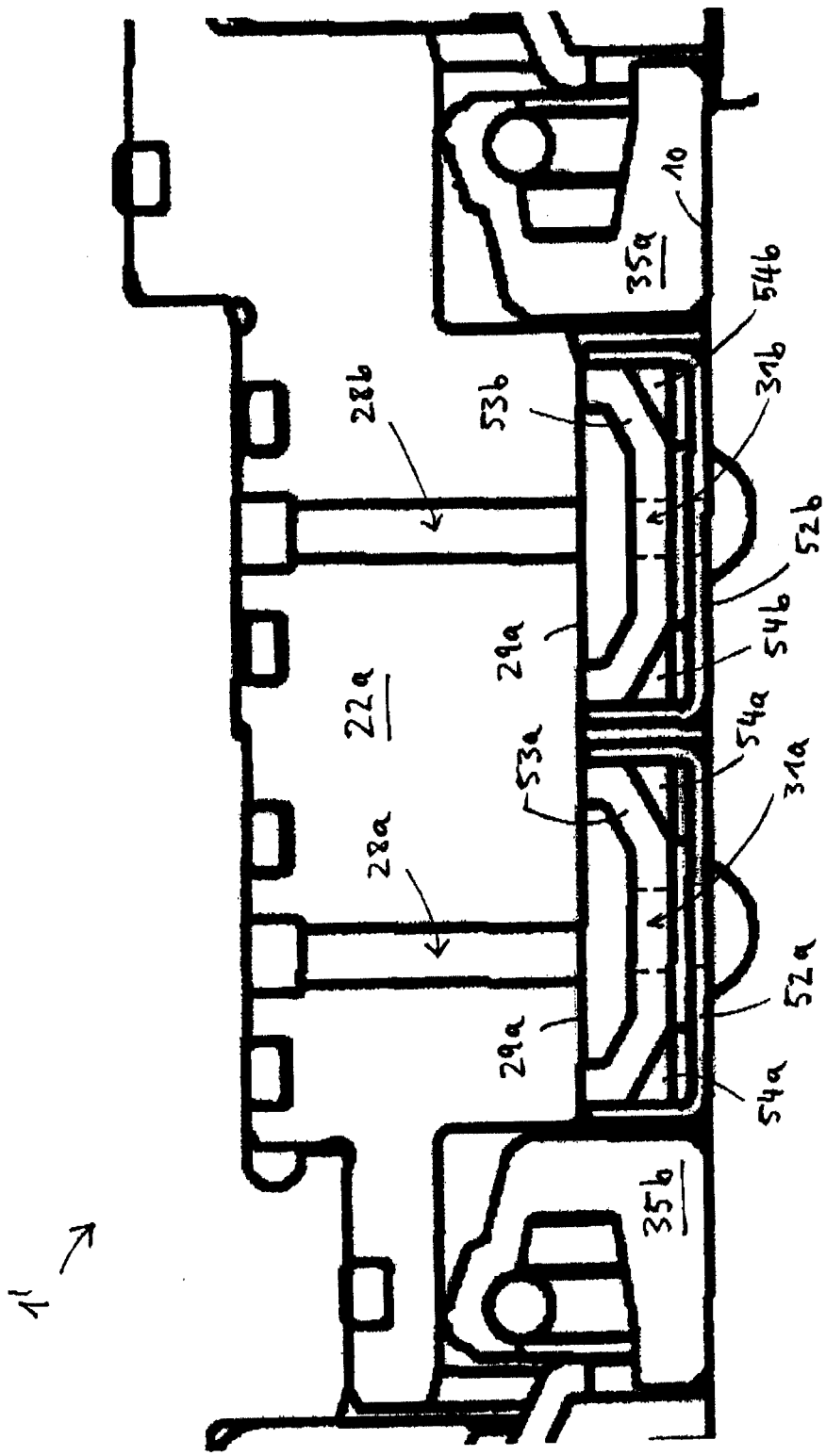
FIG. 9 shows a detail of an axial cross-sectional view of a spindle assembly according to a second embodiment.

FIG. 9 shows a detail of a axial cross-sectional view of a second embodiment of a spindle assembly 1' for a tire inflation system. Thereby, only those features which deviate from the previously shown embodiment of the spindle assembly 1 will be explicitly addressed. Features which are not explicitly described with regard to the embodiment of FIG. 9 are realized in a manner which is equivalent to the embodiment shown in the previous figures.

Notably, the embodiment shown in FIG. 9 features no bushing mounted on the spindle 3. Rather, the dynamic annular seal chambers 31a and 31b are realized by means of annular metal collars 52a and 52b, respectively, which are mounted on the outer peripheral surface 10 of the spindle 3. Furthermore, the annular seal chambers 31a and 31b are formed and enclosed by annular plastic components 53a and 53b, respectively, which are attached to the inner peripheral surface 29a of the single cartridge 22a. In the presently described embodiment, the single cartridge 22a comprises both radial through holes 28a and 28b which in the previously described embodiment were included in the two separate cartridges 22a and 22b. Additionally, the annular seal chambers 31a and 31b are formed by means of two pairs of flexible annular wedge rings, namely a first pair 54a and a second pair 54b, which are arranged radially between the plastic components 53a and 53b and the metal collars 52a and 52b, respectively. Notably, the oil seals 35a and 35b are directly mounted on the inner peripheral surface 29a of the cartridge 22a.

The functioning of the annular seal chamber 31b formed by the annular metal collar 52b, the annular plastic component 53b and the pair of wedge rings 54b is now described with reference to FIG. 10 which shows a detail of FIG. 9. An axial cross-sections of both the metal collar 52b and the annular plastic component 53b feature approximately U-like shapes, the round side of the U pointing towards the spindle axis 2, respectively. An axial length 55b of an inner axial diameter of the metal collar 52b is slightly larger than an axial length 56b of an outer axial diameter of the plastic component 53b attached to the cartridge 22a, the plastic component 53b thereby being at least partially received in the collar 52b. For example, the length 55b can be larger than the length 56b by between 0.5 and 5 percent of the length 55b or by between 1 and 3 percent of the length 55b. Importantly, an inner peripheral end 57b of the plastic component 53b is not in contact with an outer peripheral surface 59b of a central portion 58b of the collar 52b. In other words, the plastic component 53b is not in contact and/or not in sliding sealing contact with the metal collar 52b in which the plastic component 53b is at least partially received in the radial direction. In the central portion 58b, the metal collar 52b features one or several radial through holes, for example the through hole 67b shown in FIG. 10. Further through holes of the collar 52b may be disposed at different angular locations of the central portion 58b of the metal collar 52b. Likewise, the plastic component 53b features one or several radial through holes at its inner peripheral end 57b, for example the radial through hole 68b shown in FIG. 10. Further through holes of the plastic component 53b may be disposed at different angular locations of the inner peripheral end 57b of the plastic component 53b.

The sealing of the dynamic annular seal chamber 31b is effected by the pair of wedge rings 54b. An axial cross-sectional area of the wedge rings 54b has a wedge-like shape, the sharp end 60b of the wedge rings 54b pointing towards a central axis 61b of the metal collar 52b. An inner surface 62b of the wedge rings 54b, that is a surface of the wedge rings 54b facing the central axis 61b has a shape which is complementary to a shape of an outer surface 63b of a tapering portion 64b of the plastic component 53b. The wedge rings 54b are disposed axially in such as to abut on the axially outward lying upright sections 65b of the collar 52b. An axial length 66b of the rings 54b is about 25 percent of the axial length 55b of the inner axial diameter of the metal collar 52b. In slightly varied embodiments the axial length 66b can be between 10 percent and 40 percent, more typically between 15 percent and 30 percent of the axial length 55b of the inner axial diameter of the collar 52b.

Figure 10:
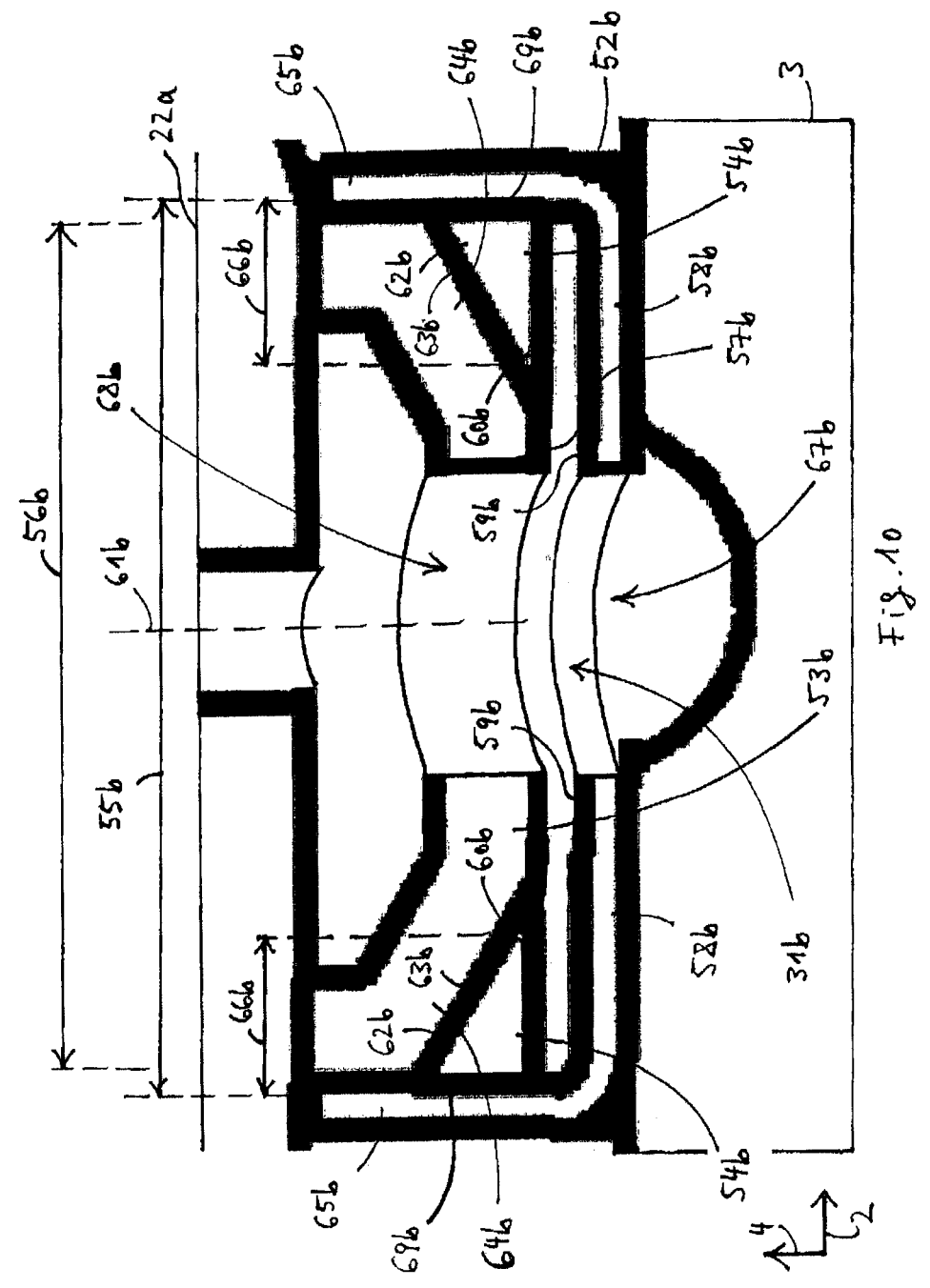

FIG. 10 shows the annular seal chamber 31b in a pressurized state. In the pressurized state, the annular wedge rings 54b are pressed in the positive radial direction such that they abut on and are pressed against the outer surface of the tapering portion 64b of the plastic component 53b, and such that they abut on and are pressed against an inner surface 69b of the upright sections 65b of the metal collar 52b, thereby sealing the annular seal chamber 31b. In a non-pressurized state (not shown), the annular wedge rings 54b abut on the outer peripheral surface 59b of the central portion 58b of the metal collar 52b, that is in the non-pressurized state the wedge rings 54b clasp around the metal collar 52b. Importantly, when the wedge rings 54b clasp the metal collar 52b in the non-pressurized state, there is a radial clearance of, for example, at least 1 mm between the rotating plastic component 53b and the stationary wedge rings 54b such that the wedge rings 54b and the plastic component 53b are not in contact or not in sliding contact in the non-pressurized state of the annular seal chamber 31b. Thus, in the non-pressurized state, there is no or almost no friction between the plastic component 53b and the wedge rings 54b and there is no or almost no friction between the plastic component 53b and the collar 52b. The radial movement of the wedge rings 54b between the pressurized and the non-pressurized state can be facilitated by a radial cut in the wedge rings 54b, the cut allowing a length of a radius of the wedge rings 54b to vary between a first length in the pressurized state, and a second length in the non-pressurized state, the first length being larger than the second length, for example by between 1 percent and 5 percent of the first length.

FIG. 11 schematically shows a detail of an axial cross-sectional view of a further embodiment of a spindle assembly 100 comprising the spindle 3 and the wheel hub 5 which can rotate about the axis 2 defined by the spindle 3. A fluid passage 12c is arranged internal to the spindle 3 and a fluid conduit 8c is arranged internal to the wheel hub 5. The fluid conduit 8c is in fluid connection with a pneumatic tire and the fluid passage 12c is in fluid connection with a pressure control unit (not shown). The fluid conduit 8c and the fluid passage 12c are furthermore in fluid communication with each other through an annular seal chamber 31c. The annular seal chamber 31c is formed by a pair of rubber sealing lips 30c which are mounted on the inner peripheral surface 14 of the wheel hub 5 and which are in sliding sealing contact with the outer peripheral surface 10 of the spindle 3. The annular seal chamber 13c is arranged in between a first volume 70a and a second volume 70b along the axial direction 2, thereby separating the first volume 70a from the second volume 70b.

A fluid channel 43c is arranged internal to the wheel hub 5 and fluidly connects the first volume 70a with the second volume 70b. Thus, fluid leaked out into the volumes 70a and/or 70b from the annular seal chamber 31c can be led through the fluid channel 43c. Analogously, another fluid channel 43d is arranged internal to the spindle 3 and fluidly connects the first volume 70a with the second volume 70b. Thus, fluid leaked out into the volumes 70a and/or 70b from the annular seal chamber 31c can be led through the fluid channel 43d. Importantly, the fluid channels 43c and 43d are fluidly separated from the fluid conduit 8c, the annular seal chamber 31c and the fluid passage 12c. In FIG. 11 this is indicated by fact that the fluid conduit 8c and the fluid passage 12c are drawn in dashed lines. Not shown in FIG. 11 is a breather line which is arranged internal to the wheel hub 5 and which connects the first volume 70a with the external environment. In a variation of the embodiment shown in FIG. 11 not explicitly depicted here, a bushing, e.g. the bushing 16 described above, can be mounted on the spindle 3 such that the rubber sealing lips 30c are in sliding sealing contact with an outer peripheral surface of the bushing.

The invention claimed is:

1. A spindle assembly for a tire inflation system, the spindle assembly comprising:
   a spindle defining an axial direction and comprising a fluid conduit;
   a rotatable part rotatably mounted on the spindle and comprising a fluid passage, the fluid passage being configured to be in fluid communication with a pneumatic tire; and
   a dynamic annular seal chamber, the annular seal chamber being disposed radially between the spindle and the rotatable part;
   wherein the fluid conduit and the fluid passage are in fluid communication with each other through the annular seal chamber, the annular seal chamber being disposed axially between a first volume and a second volume;
   wherein the first volume and the second volume are in fluid communication with each other through a fluid channel for leading fluid leaked out of the annular seal chamber and leaked into the first volume and/or into the second volume through the fluid channel, wherein a first end of the fluid channel ends in the first volume, a second end of the fluid channel ends in the second volume, and wherein the fluid channel leads around the annular seal chamber.

2. The spindle assembly of claim 1, wherein the fluid channel is arranged internal to the spindle or internal to the rotatable part.

3. The spindle assembly of claim 1, further comprising a rotatable member mounted on an inner peripheral side of the rotatable part, wherein the annular seal chamber is disposed radially inside an inner peripheral end of the rotatable member between the rotatable member and the spindle, wherein the rotatable member comprises at least one through hole for fluidly connecting the fluid passage with the annular seal chamber, and wherein the fluid channel is configured as an opening or as a through boring in the rotatable member.

4. The spindle assembly of claim 3, wherein the spindle comprises at least one second fluid conduit;
   the rotatable part comprises at least one second fluid passage;
   at least one second rotatable member is mounted on the inner peripheral side of the rotatable part, a second annular seal chamber being disposed radially inside an inner peripheral end of the second rotatable member between the second rotatable member and the spindle, wherein the second rotatable member comprises at least one second through hole for fluidly connecting the second fluid passage with the second annular seal chamber;
   wherein the second fluid conduit and the second fluid passage are in fluid communication with each other through the second annular seal chamber, the second annular seal chamber being disposed axially between the second volume and a third volume; and
   wherein the second volume and the third volume are in fluid communication with each other through at least one second fluid channel for leading fluid leaked out of the second annular seal chamber and leaked into the second volume and/or into the third volume through the second fluid channel, wherein the second fluid channel is configured as an opening or as a through boring in the second rotatable member.

5. The spindle assembly of claim 4, wherein a breather line arranged on the rotatable part or internal to the rotatable part, the breather line being in fluid communication with the first volume and with the second volume, and the breather line being configured to lead fluid leaked out of the annular seal chamber to an external environment.

6. The spindle assembly of claim 5, wherein the rotatable member is fixedly mounted on the rotatable part such that a relative radial motion and a relative rotational motion of the rotatable member with respect to the rotatable part is blocked.

7. The spindle assembly of claim 6, wherein at least 5 percent of an outer peripheral surface of the rotatable member is in direct mechanical contact with and tightly fitted on the inner peripheral surface of the rotatable part for conducting heat from the rotatable member to the rotatable part.

8. The spindle assembly of claim 7, wherein the annular seal chamber is formed by sealing means which comprise a bushing mounted on the spindle, there being a radial clearance between the spindle and the bushing along an axial extension of the bushing.

9. The spindle assembly of claim 8, wherein the bushing comprises an annular indentation formed in an inner peripheral surface of the bushing, the annular indentation forming an annular fluid channel between the bushing and the spindle, and in that the bushing features a radial through hole extending through the bushing in the radial direction, such that the annular indentation and the radial through hole fluidly connect the fluid conduit with the annular seal chamber.

10. The spindle assembly of claim 9, wherein the annular seal chamber comprises a pair of annular sealing lips mounted on an inner peripheral side of the rotatable part or mounted on an inner peripheral end of the rotatable member, the annular sealing lips being in sliding sealing contact with an outer peripheral surface of the bushing.

11. The spindle assembly of claim 10, wherein corresponding mechanical features arranged on an outer peripheral surface of the spindle and on an inner peripheral surface of the bushing, the corresponding mechanical features being in mechanical engagement thereby blocking a relative rotational motion of the bushing with respect to the spindle.

12. The spindle assembly of claim 11, wherein the corresponding mechanical features comprise a first recess in the outer peripheral surface of the spindle, a second recess in the inner peripheral surface of the bushing and a mechanical key, wherein the mechanical key is configured to be completely or at least partially received in the first recess and, simultaneously, to be completely or at least partially received in the second recess.

13. The spindle assembly of claim 12, wherein the first recess and/or the second recess is configured as a spot face, a bore or a slot and the mechanical key is configured as a metal sphere, a metal gudgeon, a Woodruff key or a feather key.

14. The spindle assembly of claim 7, wherein the annular seal chamber comprises:
    an annular collar mounted on an outer peripheral surface of the spindle;
    an annular plastic component mounted on an inner peripheral surface of the rotatable member and at least partially received in the collar, an axial cross section of the annular plastic component having an approximately U-like shape, the rounded end of the U-like shape pointing towards the spindle axis; and
    a pair of non-closed flexible seal rings arranged between the collar and the plastic component on axially opposing sides of the annular plastic component;
    wherein the annular collar is not in contact with the annular plastic component and wherein the annular collar, the annular plastic component and the non-closed flexible seal rings are configured such that
    when the seal chamber is not pressurized, the non-closed seal rings clasp around the annular collar and are not in contact with the annular plastic component; and
    when the seal chamber is pressurized, the non-closed seal rings are forced radially outward, such that the non-closed seal rings are each arranged axially between the annular plastic component and the annular collar and are each pressed against the annular collar and the annular plastic component, thereby sealing the seal chamber.

15. The spindle assembly of claim 14, wherein the rotatable part is mounted on the spindle with a pair of bearings, wherein the bearings are axially spaced with respect to each other and wherein the rotatable member and the sealing means are arranged axially between the bearings.

16. The spindle assembly of claim 15, further comprising a pair of annular oil seals, the oil seals sealing the annular seal chamber from the bearings.

17. The spindle of claim 1, wherein the fluid conduit is completely or at least partially disposed internal to the spindle and/or the fluid passage is completely or at least partially disposed internal to the rotating part.

* * * * *